US012186764B2

(12) United States Patent
Giannazzo

(10) Patent No.: US 12,186,764 B2
(45) Date of Patent: *Jan. 7, 2025

(54) ADHESIVE SPLITTER SYSTEMS AND METHODS OF USING THE SAME

(71) Applicant: Dal-Tile, LLC, Dallas, TX (US)

(72) Inventor: Felipe Giannazzo, Dallas, TX (US)

(73) Assignee: Dal-Tile, LLC, Dallas, TX (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/641,457

(22) PCT Filed: Sep. 15, 2020

(86) PCT No.: PCT/US2020/050802

§ 371 (c)(1),
(2) Date: Mar. 9, 2022

(87) PCT Pub. No.: WO2021/055310

PCT Pub. Date: Mar. 25, 2021

(65) Prior Publication Data

US 2022/0314241 A1 Oct. 6, 2022

Related U.S. Application Data

(63) Continuation of application No. 16/577,237, filed on Sep. 20, 2019, now Pat. No. 11,426,740.

(51) Int. Cl.

| | |
|---|---|
| ***B05B 1/14*** | (2006.01) |
| ***B05B 1/04*** | (2006.01) |
| ***B05B 1/20*** | (2006.01) |
| ***B05B 1/24*** | (2006.01) |
| ***B05B 9/00*** | (2006.01) |

(52) U.S. Cl.
CPC .................. *B05B 1/14* (2013.01); *B05B 1/04* (2013.01); *B05B 1/20* (2013.01); *B05B 1/24* (2013.01); *B05B 9/002* (2013.01)

(58) Field of Classification Search
CPC .... B05B 1/04; B05B 1/14; B05B 1/20; B05B 1/24; B05B 9/002
USPC .......... 239/548, 566, 569, 399, 402, 13, 135
See application file for complete search history.

(56) References Cited

U.S. PATENT DOCUMENTS

| | | | | |
|---|---|---|---|---|
| 2,734,224 | A | 2/1956 | Winstead | |
| 3,720,572 | A | 3/1973 | Soda et al. | |
| 4,017,240 | A | 4/1977 | Nelson | |
| 5,382,312 | A * | 1/1995 | Raterman | B32B 37/1284 239/399 |
| 5,783,129 | A | 7/1998 | Shirai et al. | |
| 5,992,453 | A | 11/1999 | Zimmer | |
| 6,197,898 | B1 | 3/2001 | van den Berg et al. | |

(Continued)

OTHER PUBLICATIONS

International Search Report and Written Opinion for PCT Application No. PCT/US2020/050802 mailed Dec. 7, 2020.

*Primary Examiner* — Steven J Ganey
(74) *Attorney, Agent, or Firm* — Troutman Pepper Hamilton Sanders LLP; James E. Schutz; Chris N. Davis

(57) ABSTRACT

Disclosed herein are adhesive splitter systems and methods for using the same. The adhesive splitter systems comprise a multi-nozzle adapter configured to dispense multiple streams of adhesive onto a substrate. The splitter system can also include an attached adhesive dispenser for providing adhesive to the multi-nozzle adapter.

18 Claims, 8 Drawing Sheets

(56) References Cited

U.S. PATENT DOCUMENTS

| | | | | |
|---|---|---|---|---|
| 6,210,141 | B1 * | 4/2001 | Allen | B05C 5/0279 425/188 |
| 6,749,413 | B2 | 6/2004 | Fare' | |
| 11,426,740 | B2 * | 8/2022 | Giannazzo | B05B 1/04 |
| 2004/0195392 | A1 | 10/2004 | Miinalainen et al. | |
| 2007/0119368 | A1 | 5/2007 | Pertilla et al. | |
| 2009/0098237 | A1 | 4/2009 | Itadani et al. | |

* cited by examiner

ADHESIVE SPLITTER SYSTEMS AND METHODS OF USING THE SAME

CROSS-REFERENCE TO RELATED APPLICATIONS

This application is a National Stage Entry of, and claims priority to, PCT Patent Application No. PCT/US20/50802 filed 20 Sep. 2020, which claims priority to U.S. patent application Ser. No. 16/577,237, filed on 20 Sep. 2019, the disclosures of which are herein incorporated by reference in their entireties.

FIELD OF THE DISCLOSURE

This disclosure relates generally to adhesive splitter systems and related methods. In particular, this disclosure relates to removable and replaceable multi-nozzle adapters mounted to adhesive dispensers to evenly apply adhesives.

BACKGROUND

When sheets or panels are manufactured, components can be combined using an adhesive. However, use of traditional devices to administer a hardening resin requires an inefficient and expensive cleaning process between applications. Improved methods and devices are desired.

SUMMARY

Embodiments of the present disclosure describe an affordable and efficient solution for applying adhesive in sheet or panel manufacturing processes. Accordingly, disclosed herein are adhesive splitter systems for evenly applying adhesive to a substrate preferably in sheet or panel form. The system can include a multi-nozzle adapter including a fluid inlet, a plurality of fluid outlets, and a fluid dispersion assembly in fluid communication with the fluid inlet and the plurality of fluid outlets. The fluid dispersion assembly can include a set of channels, each channel including a channel inlet and a plurality of channel outlets. Each nozzle can be configured to receive adhesive from the fluid inlet through the channel inlet and discharge some portion of the received adhesive through one or more of the channel outlets. The fluid dispersion assembly can also include a set of nozzle clusters, wherein each nozzle cluster can be in fluid communication with a channel outlet, receive some portion of adhesive from that channel outlet, and discharge some portion of that received adhesive through at least one of the fluid outlets. In some embodiments, the fluid inlet can be in fluid communication with at least one of the fluid outlets.

In some embodiments, the adhesive can include a thermosetting resin. In some embodiments, the thermosetting resin can be a bicomponent resin including a resin and a hardener. In some embodiments, the adhesive can include a thermal-activated resin.

In some embodiments, a fluid conveyor can be further included. The fluid conveyor can be at least partially surrounded by a rigidity shaft.

In some embodiments, the fluid conveyor can include a hollow tube having an inner surface, wherein fins are disposed on the inner surface of the hollow tube to create a turbulent flow for mixing the resin and the hardener.

In some embodiments, the multi-nozzle adapter is removable and replaceable.

In some embodiments, the splitter system can further include an adhesive dispenser. In some embodiments, the removable and replaceable multi-nozzle adapter can be attached to the adhesive dispenser. In some embodiments, the adhesive dispenser can be connected to the fluid conveyor on an end opposite the multi-nozzle adapter. The dispenser can be configured to separately feed the resin and the hardener to the fluid conveyor.

In some embodiments, the rigidity shaft can be formed by metal, for example aluminum or steel.

In some embodiments, the fluid conveyor can be made of a polymer, for example a thermoplastic polymer. In certain embodiments, the polymer is polypropylene (PP).

In some embodiments, the fluid conveyor can be press-fitted into the fluid inlet of the multi-nozzle adapter.

In some embodiments, the fluid conveyor can be twist-locked into the fluid inlet of the multi-nozzle adapter.

In some embodiments, the adhesive dispenser can further include a valve assembly to control adhesive flow.

In some embodiments, the adhesive can be fed to the multi-nozzle adapter at ambient temperature. In other embodiments, a heated adhesive can be fed to the multi-nozzle adapter.

In some embodiments, the multi-nozzle adapter can include 2 or more nozzles, preferably 8 or more nozzles, for example from 2 to 24 nozzles.

In some embodiments, the multi-nozzle adapter can be made in a single piece. In some embodiments, the multi-nozzle adapter can be 3D printed.

In some embodiments, the multi-nozzle adapter can be made of polymer, for example a thermoplastic polymer and/or a photopolymer resin. In certain embodiments, the polymer can be polyethylene terephthalate (PET).

In some embodiments, the fluid conveyor can be 1 cm or more in length, preferably 10 cm or more in length, for example from 15 cm to 25 cm in length.

Disclosed herein also are methods for evenly applying adhesive to a substrate, the method including providing a multi-nozzle adapter, the multi-nozzle adapter including a fluid inlet, a plurality of fluid outlets, and a fluid dispersion assembly in fluid communication with the fluid inlet and the plurality of fluid outlets, wherein the fluid dispersion assembly includes a set of nozzles, each nozzle including a single channel inlet and a plurality of channel outlets, and a set of nozzle clusters, each cluster configured to engage a channel outlet. The methods can further include feeding adhesive into the multi-nozzle adapter through the fluid inlet, such that at a first stage of dispersion each nozzle receives a portion of the fed adhesive and discharges some of that portion of adhesive through a channel outlet, and at a second stage of dispersion each nozzle cluster receives a portion of adhesive from the channel outlet it is in fluid communication with and discharges some of that portion of adhesive through one of the fluid outlets.

In some embodiments, the methods for evenly applying adhesive to a substrate first include loading a thermosetting resin into an adhesive dispenser and facilitating a flow of the thermosetting resin from the adhesive dispenser into the multi-nozzle adapter. In some embodiments, the methods for evenly applying adhesive to a substrate first include loading a resin and a hardener into separate chambers of an adhesive dispenser, facilitating a flow of the resin and a separate flow of the hardener from the adhesive dispenser into a fluid conveyor, and mixing the resin and the hardener inside the fluid conveyor to create an adhesive before feeding the adhesive to the multi-nozzle adapter. In some embodiments, the adhesive can include a thermal activated resin.

In some embodiments, the system comprises a removable and replaceable multi-nozzle adapter for an adhesive dispenser. In some embodiments, the system comprises an adhesive dispenser and a multi-nozzle adapter connectable to an outlet of the dispenser.

In some embodiments, a method for manufacturing a multi-nozzle adapter that comprises a 3D printing step is contemplated. In other embodiments, a method for manufacturing a multi-nozzle adapter that comprises a molding step, preferably an injection molding step, is contemplated.

It is to be noted that the fact that the multi-nozzle adapter is removable and replaceable forms an inventive concept irrespective of other features of the invention. Thereto the present invention, in a further independent aspect, relates to a multi-nozzle adapter for an adhesive splitter system that comprises one fluid inlet and a plurality of fluid outlets, wherein the plurality of fluid outlets is configured to eject at least a portion of an adhesive received from the fluid inlet, and wherein the multi-nozzle adapter is removable and replaceable. It is also to be noted that the multi-nozzle adapter according to this further embodiment may comprise any of the features discussed in relation to the previous embodiment. In particular, the multi-nozzle adapter may be made of polymeric material and/or may be formed in one single piece and/or may be 3D printed.

DETAILED DESCRIPTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Therefore, specific structural and functional details disclosed herein are not to be interpreted as limiting, but merely as a representative basis for teaching one skilled in the art to variously employ the present invention.

Figure 1:
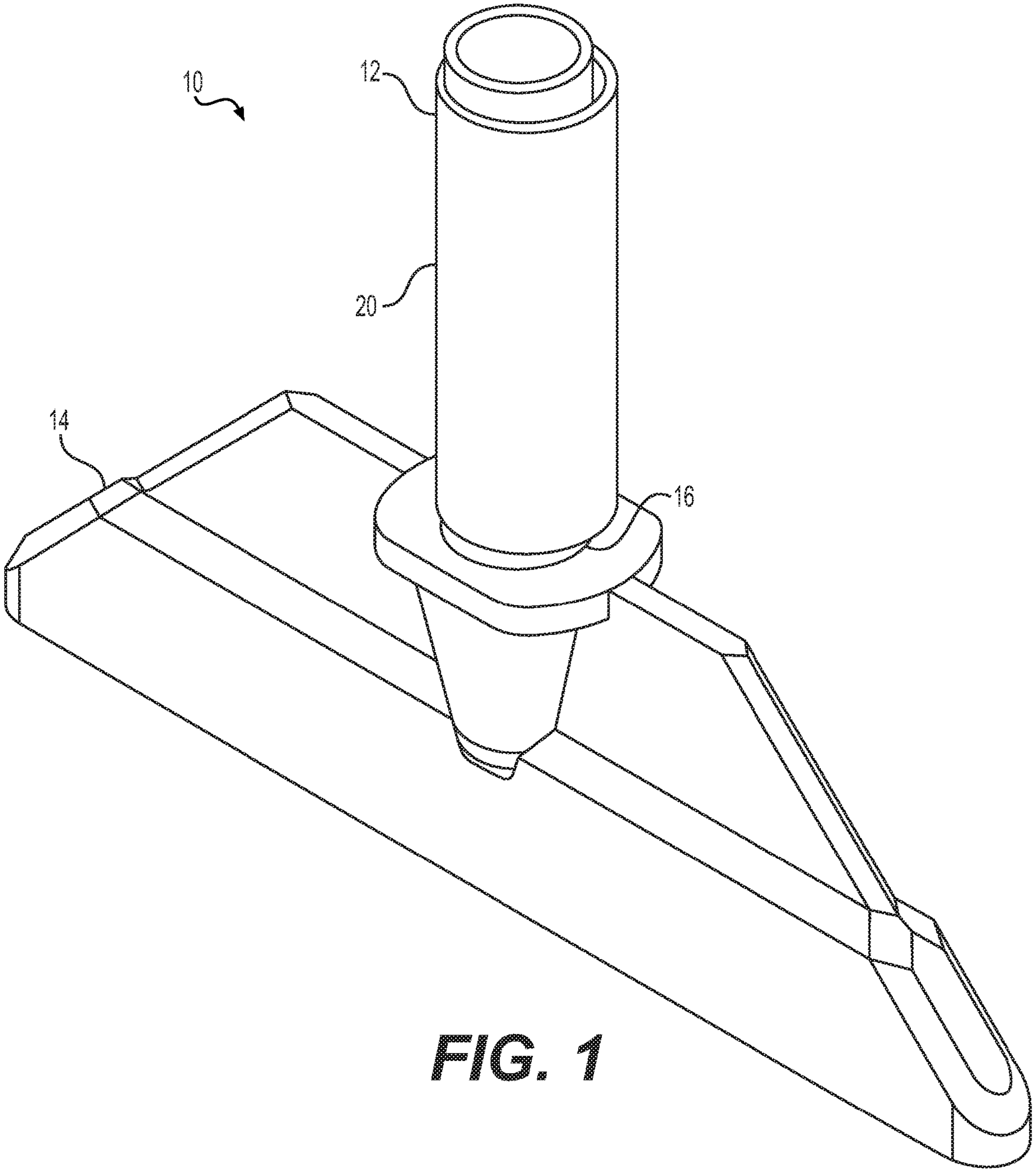
FIG. 1 depicts a perspective view of an adhesive splitter system, not necessarily drawn to scale.

FIGS. 1-8 depict various embodiments of an adhesive splitter system. FIG. 1 depicts adhesive splitter 10, including a fluid conveyor 12 and a multi-nozzle adapter 14. In some embodiments, multi-nozzle adapter 14 can include a fluid inlet 16. In some embodiments, the multi-nozzle adapter 14 can be removable and replaceable. In some embodiments, the multi-nozzle adapter 14 can be single-use or few-use. In still some embodiments, multi-nozzle adapter 14 can be disposable. The fluid conveyor 12 can include a hollow tube having an inner surface and an outer surface. Mixing elements (not shown) such as fins can be disposed on the inner surface of the hollow tube to create a turbulent flow for mixing the resin and the hardener. In some embodiments, fluid conveyor 12 is removable and replaceable. In some embodiments, fluid conveyor 12 is single-use or few-use. In some embodiments, fluid conveyor 12 is disposable. In some embodiments, adhesive splitter 10 can further include rigidity shaft 20. The rigidity shaft 20 can at least partially surround the fluid conveyor 12. However, in other embodiments, the rigidity shaft 20 can fully surround the fluid conveyor 12. In some embodiments, the fluid inlet 16 is in fluid communication with at least one of the fluid outlets 22. In still some embodiments, adhesive splitter 10 can include multi-nozzle adapter 14 without the fluid conveyor 12.

Figure 2:
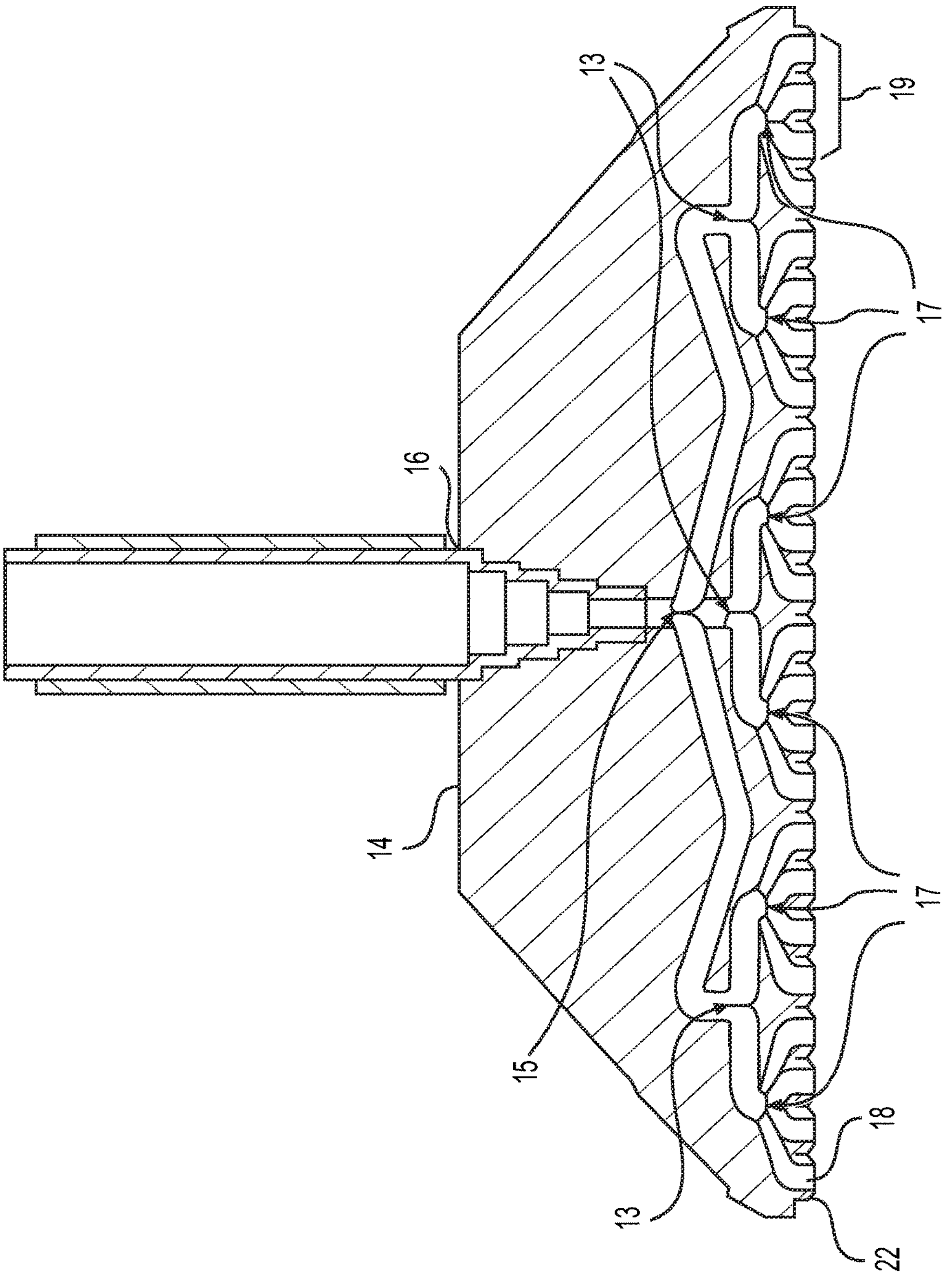
FIG. 2 depicts a cross-sectional view of an adhesive splitter system, not necessarily drawn to scale.
Figure 3:
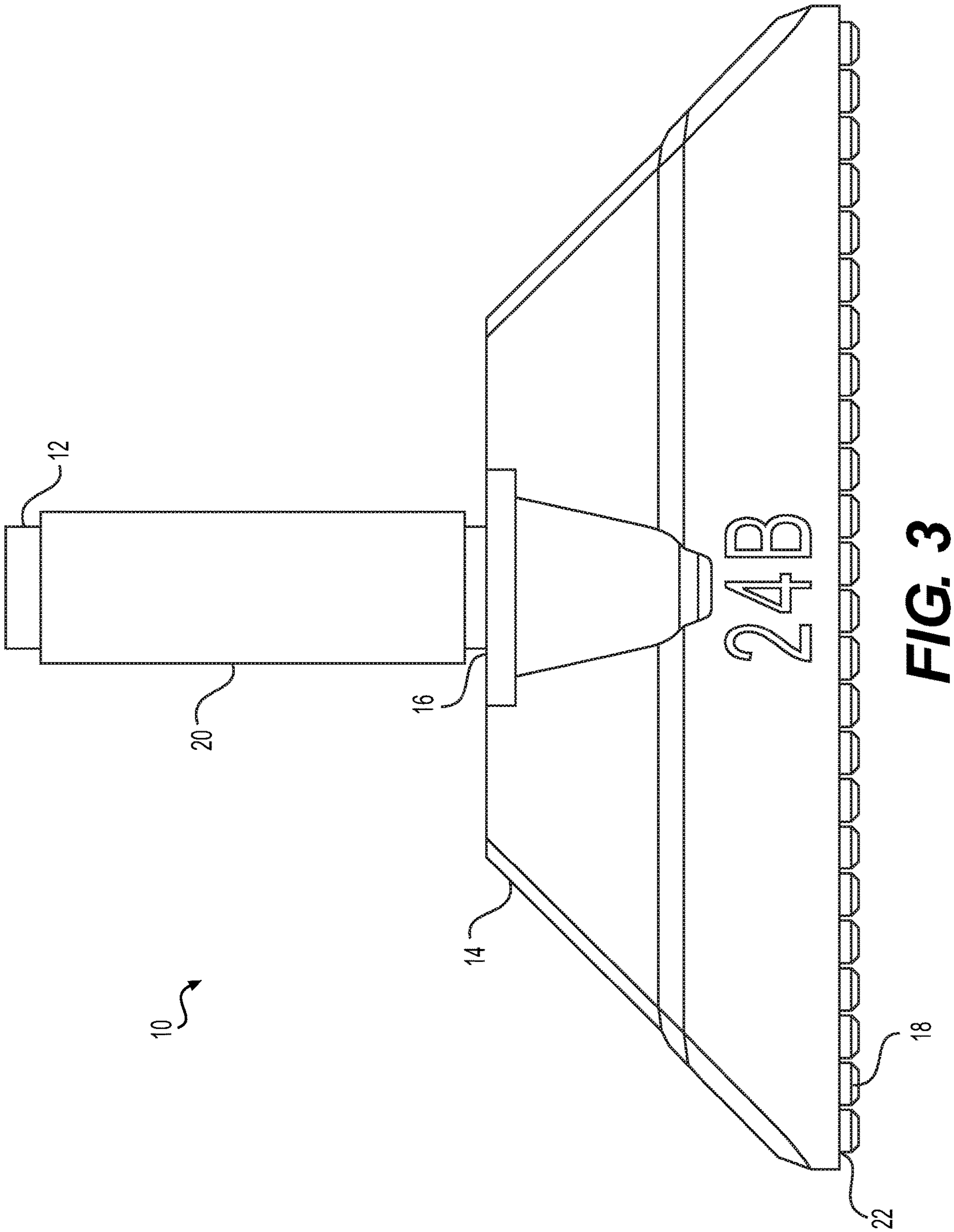
FIG. 3 depicts a side view of an adhesive splitter system, not necessarily drawn to scale.

As shown in FIGS. 2-3, multi-nozzle adapter 14 can further include at least one channel 13. In some embodiments, adapter 14 can include a set of channels 13. The channels are preferably integrally formed or separately disposed on the inside of adapter 14. Each channel 13 can include a single channel inlet 15 and one or a plurality of channel outlets 17. The channel inlet 15 can be configured to receive a portion of adhesive from the fluid inlet 16 and discharge some of that portion of adhesive through one of the channel outlets 17. Multi-nozzle adapter 14 can further include a nozzle cluster or a set of nozzle clusters 19. There can be two more nozzle clusters 19 in the cluster set. There can be two or more nozzles 18 in each nozzle cluster. Each nozzle can have at least one inlet and at least one outlet. Each of the cluster nozzle inlets are fluidly connected to the fluid inlet and are configured to receive a portion of adhesive from the fluid inlet 16 and discharge that portion of adhesive. Preferably, each nozzle cluster 19 is connected to the fluid inlet 16 via a channel 13. For example, each of the cluster nozzle inlets can be configured to engage a channel outlet 17. In some embodiments, some of the portion of adhesive received from the engaged channel outlet 17 can be discharged through at least one of the fluid outlets 22. The adapter 14 can separate the flow of the adhesive from the fluid inlet 16 into multiple streams through the channels 13 and/or the nozzle clusters 19.

In some embodiments, the fluid inlet is in fluid communication with at least one of the channels 13 and at least one of the nozzle clusters 19. In some embodiments, the fluid inlet is in fluid communication with at least two of the channels 13 and at least four of the nozzle clusters 19.

Figure 4:
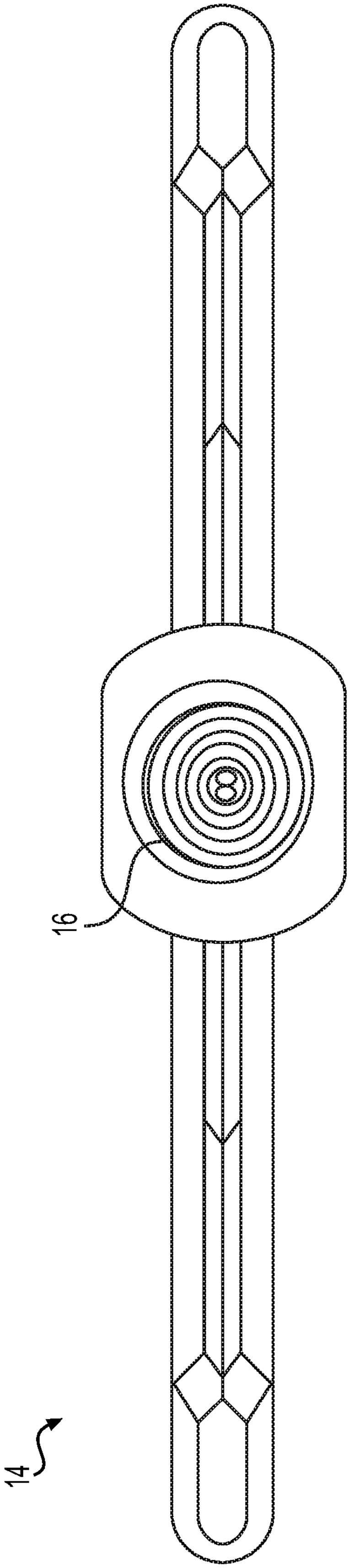
FIG. 4 depicts a top view of an adhesive splitter system, not necessarily drawn to scale.

FIG. 4 shows a top view of multi-nozzle adapter 14. Fluid inlet 16 can be integrally or separately formed into the top side of multi-nozzle adapter 14. The fluid inlet 16 can further include ridging or similar design such that fluid conveyor 12 can be twisted into inlet 16 and locked into place. However, any suitable means for connecting the fluid inlet 16 and the fluid conveyor 12 can be used. For example, fluid conveyor 12 can be press-fitted into the fluid inlet 16 of the multi-nozzle adapter. In some embodiments, fluid conveyor 12 can be connected to the inlet 16 by screw, magnet, snap-in, friction-fit, a combination thereof, or any comparable mechanism now known or later discovered. In some embodiments, fluid conveyor 12 can indirectly engage inlet 16 through an intermediary connecting component. In other embodiments, fluid conveyor 12 can feed adhesive to the multi-nozzle adapter without engaging it directly (e.g. floating above the fluid inlet 16). In some embodiments, the top side of the adapter can be shorter in length than the bottom side of the adapter.

Figure 5:
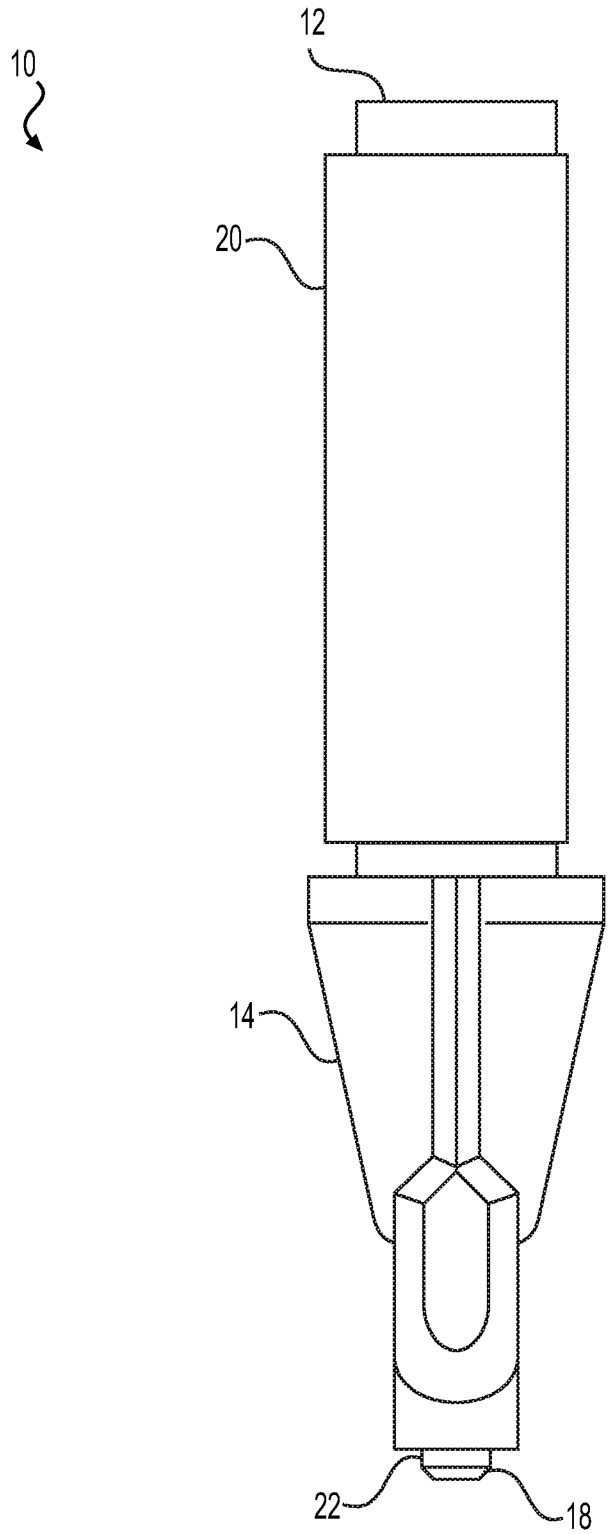
FIG. 5 depicts a side view an adhesive splitter system, not necessarily drawn to scale.
Figure 6:
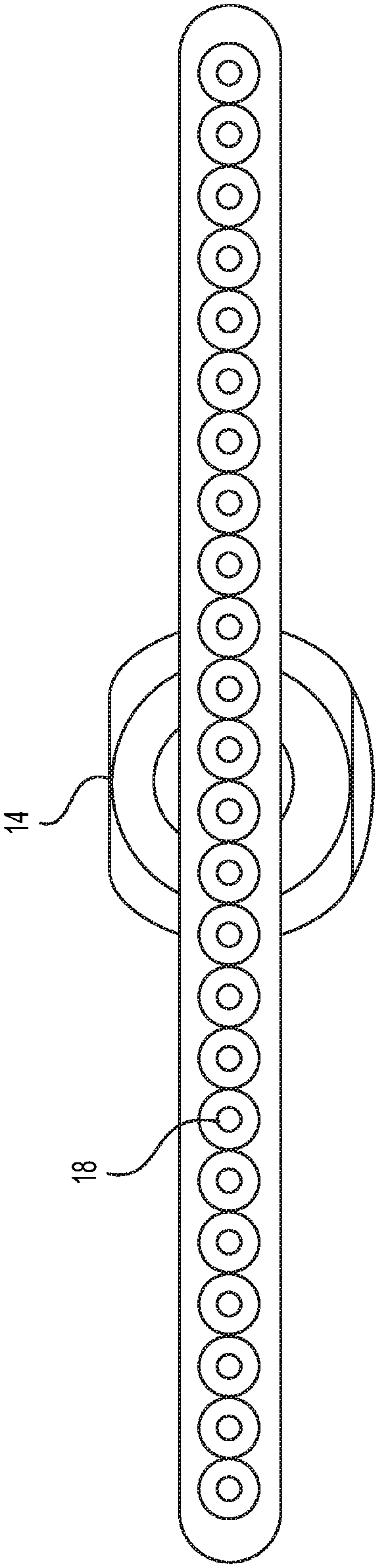
FIG. 6 depicts a bottom view of a multi-nozzle adapter, not necessarily drawn to scale.
Figure 7:
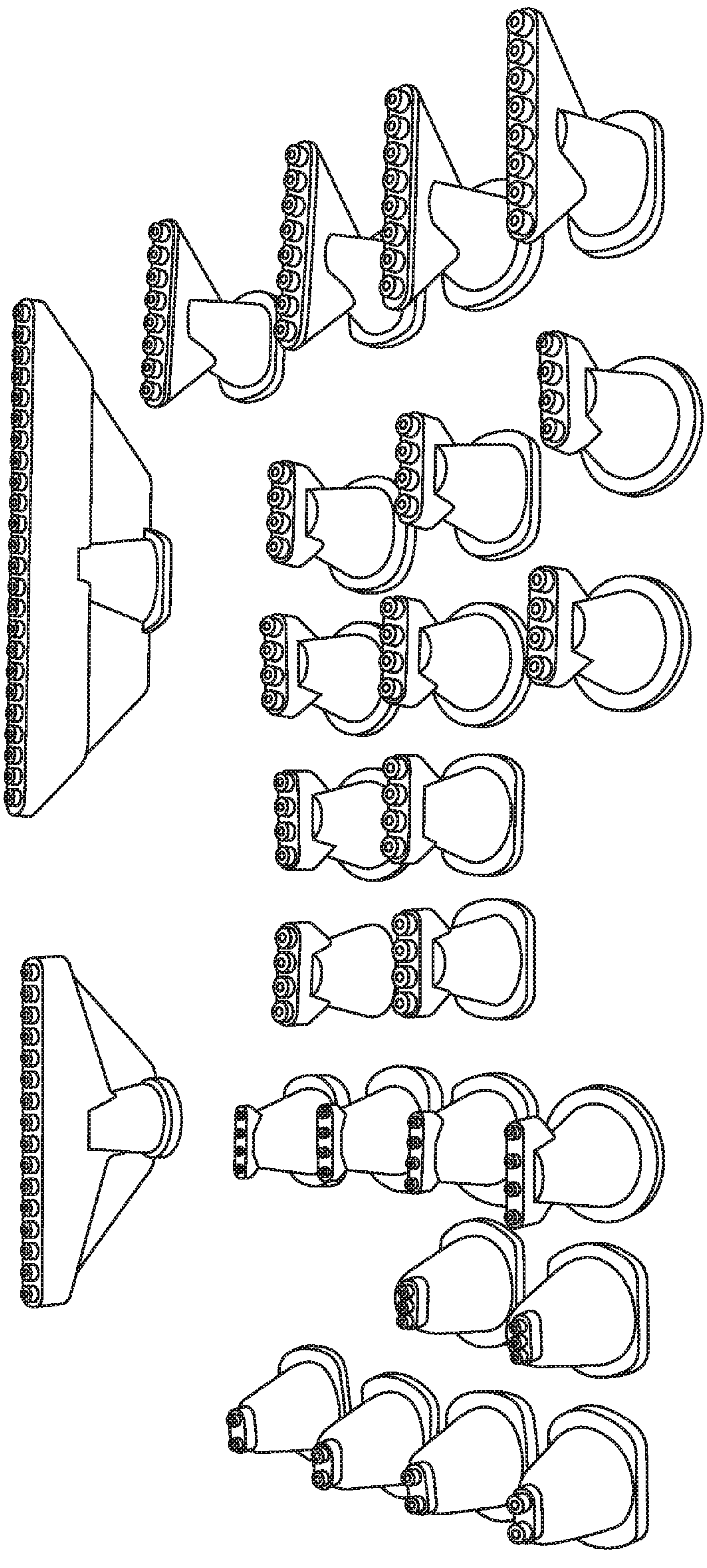
FIG. 7 depicts perspective views of splitter embodiments with a varying number of nozzles, not necessarily drawn to scale.

As shown in FIG. 5, in some embodiments, the top portion of the adapter can taper from a wider top side to a narrower bottom side. As shown in FIG. 6, in some embodiments, nozzles 18 and corresponding fluid outlets 22 are substantially linearly aligned. In other embodiments, nozzles 18 and corresponding fluid outlets 22 do not form a line but can be offset from each other. As shown in FIG. 7, multi-nozzle adapter 14 can include any suitable number of nozzles—and corresponding outlets—for applying multiple streams of adhesive onto a flooring substrate. For example, multi-nozzle adapter 14 can include 2 to 100 nozzles (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95) and 2 to 100 corresponding fluid outlets (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95). In certain embodiments, adapter 14 includes from 2 to 24 nozzles and from 2 to 24 fluid outlets.

The multi-nozzle adapter 14 can be formed in a single piece. Preferably the multi-nozzle adapter can be made using any suitable 3D printing technique, such as with a fused deposition modeling (FDM) machine or a stereolithography (SLA) machine. In other embodiments, the multi-nozzle adapter is molded in two shells, e.g. via injection molding, and then the shells are joined together, preferably welded, for example with ultrasonic welding.

Figure 8:
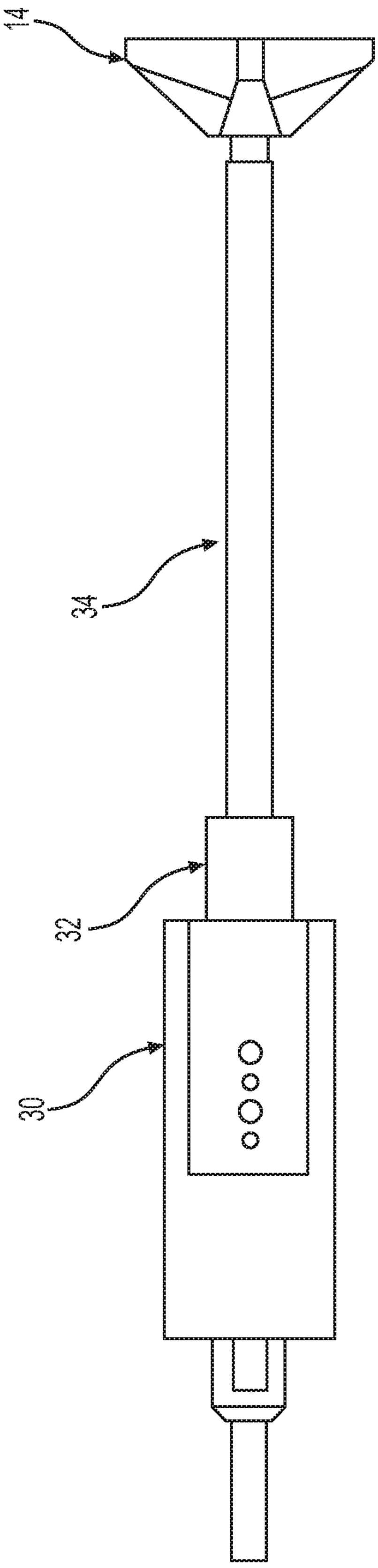
FIG. 8 depicts a side view of an adhesive splitter system, not necessarily drawn to scale.

In some embodiments, as shown in FIG. 8, adhesive splitter system 10 can further comprise an adhesive dispenser 30. In certain embodiments, the adhesive dispenser is a gun. In other embodiments, adhesive dispenser 30 is a sprayer. Still any suitable dispenser mechanism can be used. In one embodiment, the adhesive dispenser 30 can connect to multi-nozzle adapter 14 through threaded attachment 32 and/or tubular member 34. Inside adhesive dispenser 30 can be at least one chamber (not shown) for housing an adhesive component. For example, the chamber can house a mono-component resin, such as a thermal-activated resin. In other embodiments, inside adhesive dispenser 30 can be at least two chambers (not shown) for housing a resin and a hardener, separate. In other embodiments, adhesive dispenser 30 can include any suitable structure to house an adhesive component (e.g. tubes). In some embodiments, adhesive dispenser 30 will not have an adhesive storage chamber or adhesive storage structure but may receive the adhesive component or components from an external reservoir. In this embodiment, the component could flow freely in open space inside the dispenser 30. A drive mechanism for moving the resin and the hardener through the adhesive dispenser 30 and subsequently through tubular member 34 can also be included inside or outside of adhesive dispenser 30. The drive mechanism can include at least one pump, for example a piston pump, or a gear pump, a combination thereof, or any other suitable means now known or later discovered. In some embodiments, where the fluid conveyor 12 is disposed between the adhesive dispenser 30 and the multi-nozzle adapter 14, the adhesive dispenser 30 can be connected to the fluid conveyor 12 on an end opposite the multi-nozzle adapter 14. Moreover, adhesive dispenser 30 can include a valve assembly to control the flow of the resin and the hardener. For example, the valve assembly can include a pneumatic valve or any other suitable valve system now known or later discovered. The valve assembly can control speed of flow, rate of flow, volume of flow, and the like. The valve assembly can further control stop and start of flow. In lieu of threaded attachment 32, any suitable intermediary connecting component can be used. The system can be attached to a robot or a pantograph or a moving and/or orientating device and can be included in a gluing line. In still other embodiments, the adhesive dispenser 30 can further include a heating element for heating the resin and/or the hardener before being fed to the fluid conveyor 12. The resin and/or the hardener can be heated to a temperature of 30 degrees C. to 50 degrees C. (e.g., 35 degrees C., 40 degrees C., 45 degrees C.).

According to the preferred embodiment of the invention, the multi-nozzle adapter 14 can be made of any suitable polymer now known or later discovered or developed, including but not limited to thermoplastics such as polyethylene (PE), polypropylene (PP), polyethylene terephthalate (PET), acrylonitrile butadiene styrene (ABS), polyvinyl chloride (PVC), polyamide (PA), photopolymer resins, combinations thereof, and the like. In a preferred embodiment, the multi-nozzle adapter is formed from polyethylene terephthalate (PET). In some embodiments, the fluid conveyor 12 can be made of any suitable polymer now known or later discovered or developed, including but not limited to thermoplastics such as polyethylene (PE), polypropylene (PP), polyethylene terephthalate (PET), acrylonitrile butadiene styrene (ABS), polyvinyl chloride (PVC), polyamide (PA), photopolymer resins, combinations thereof, and the like. In certain embodiments, the fluid conveyor 12 can be made of polypropylene (PP). In some embodiments, rigidity shaft 20 can be made of generally all metals and alloys thereof now known or later developed or discovered, including, but not limited to copper, steel, aluminum, tungsten, titanium, and/or any combination thereof.

In some embodiments, multi-nozzle adapter 14 can be any height and/or any width suitable to accommodate nozzles 18 and/or fluid outlets 22. In some embodiments, multi-nozzle adapter 14 can have multiple heights and/or widths. It can be any overall height and/or width suitable to at least partially house nozzles 18 and/or fluid outlets 22. In some embodiments, multi-nozzle adapter 14 can have a height of from 10 mm or more, preferably 20 mm or more (e.g. 25 mm to 40 mm, 30 mm to 35 mm). In some embodiments, multi-nozzle adapter 14 can have a width, of from 10 cm to 50 cm. In some embodiments, multi-nozzle adapter 14 can have a width of 2 cm or more (e.g. 15 cm to 45 cm, 10 cm to 15 cm, 3 cm to 7 cm). In some embodiments, multi-nozzle adapter 14 can have a width of from 20 cm to 40 cm. In some embodiments, the diameter of each of nozzles 18 and each of fluid outlets 22 can be substantially the same and/or uniform. In some embodiments, the diameter of each of nozzles 18 can be 10 mm or lower, preferably 5 mm or lower, for example 3 mm or lower, from 0.5 mm to 5 mm, 1 mm to 3 mm or 1 mm to 10 mm (e.g. 2 mm, 3 mm, 4 mm, 5 mm, 6 mm, 7 mm, 8 mm, 9 mm). In some embodiments, fluid conveyor 12 can have a length of from 15 cm to 25 cm (e.g., 17 cm, 18 cm, 19 cm, 20 cm, 21 cm, 22 cm, 23 cm, 24 cm). In some embodiments, the diameter of each of fluid outlets 22 can be 1 mm to 10 mm (e.g. 2 mm, 3 mm, 4 mm, 5 mm, 6 mm, 7 mm, 8 mm, 9 mm). The diameter of each nozzle 18 can be equal to or less than the diameter of a corresponding fluid outlet 22. In some embodiments, fluid conveyor 12 can have a length of from 15 cm to 25 cm (e.g., 17 cm, 18 cm, 19 cm, 20 cm, 21 cm, 22 cm, 23 cm, 24 cm).

In some embodiments, the resin viscosity can be lower than 1000 cPs, for example it can range from 500 cPs to 700 cPS, preferably 640 cPs. In some embodiments, the hardener viscosity can range from 200 cPs to 400 cPs, preferably 350 cPs. The viscosity of the adhesive formed by the mixing of the resin and the hardener can range from 400 to 600 cPs, preferably 500 cPs. All viscosities are at 25 degrees C. In some embodiments, flow ratio of the adhesive can range from 10 CC/second to 20 CC/second. Without the splitter adapter 14, the adhesive application time was about 13 to 15 seconds (e.g. 13.6 seconds for 14 rows) and the pressing time was about 14 to 16 seconds (e.g. 15 seconds). In case of gluing two or more objects, such as in sheet form, pressing time is the time that pressure must be kept for spreading the adhesive on the contact surfaces. With the splitter adapter, the adhesive application takes about 2 to 3 seconds (e.g. 2.6 seconds for 48 rows), and the pressing time 7 to 9 seconds (e.g. 8 seconds). For an adapter with 24 fluid outlets, the application time decreased to 1 to 3 seconds (e.g. 1.76 seconds). The decreased application and pressing times have resulted in increased productivity of the process from about 2 to 2.5 pieces per minute to about 4.5 to 5 pieces per minute. Moreover, the overall spread of the glue is better and more controllable.

In some embodiments, a method for evenly applying adhesive to a flooring substrate is contemplated. It includes loading a resin and a hardener into separate chambers of an adhesive dispenser 30. It can also include facilitating a flow of the resin and a separate flow of the hardener from the adhesive dispenser 30 into fluid conveyor 12. In some embodiments, it further includes mixing the resin and the hardener inside the fluid conveyor 12, or otherwise, to create an adhesive. Multi-nozzle adapter 14 can be connected to the fluid conveyor 12. The adhesive can then be fed into the multi-nozzle adapter 14 through the fluid inlet 16. Each nozzle 18 can receive a portion of the fed adhesive and discharge that portion of adhesive through a coupled fluid outlet 22. In some embodiments, the adhesive can be fed to the multi-nozzle valve at ambient temperature. In other embodiment the resin and/or the hardener can be heated before being loaded into the dispenser 30.

What is claimed is:

1. An adhesive splitter system comprising:

a multi-nozzle adapter including a fluid inlet, a plurality of fluid outlets, and a fluid dispersion assembly in fluid communication with the fluid inlet and the plurality of fluid outlets; and a fluid conveyor for feeding the adhesive into the fluid inlet, the fluid conveyor comprising a hollow tube having an inner surface, wherein fins are disposed on the inner surface of the hollow tube to create a turbulent flow for mixing a resin and a hardener, the fluid dispersion assembly comprising:

a set of channels, each channel including a channel inlet and a plurality of channel outlets, wherein each channel is configured to receive a portion of the adhesive from the fluid inlet through the channel inlet and discharge some of that portion of the adhesive through one or more of the channel outlets, and a set of nozzle clusters, wherein each cluster is in fluid communication with one of the channel outlets and is configured to receive some of the portion of the adhesive discharged from one or more of the channel outlets, and discharge some portion of that received adhesive through one of the fluid outlets, wherein the fluid inlet is in fluid communication with at least one of the fluid outlets.

2. The adhesive splitter system of claim 1, wherein the multi-nozzle adapter is removable and replaceable.

3. The adhesive splitter system according to claim 1, wherein the adhesive is a bicomponent resin comprising the resin and the hardener.

4. The adhesive splitter system according to claim 1, wherein the adhesive splitter system further comprises an adhesive dispenser connected to the fluid conveyor on an end opposite the multi-nozzle adapter and wherein the adhesive dispenser is configured to separately feed the resin and the hardener to the fluid conveyor.

5. The adhesive splitter system according to claim 4, wherein the adhesive dispenser further comprises one or more pneumatic valves to control adhesive flow.

6. The adhesive splitter system of claim 4, wherein the adhesive dispenser comprises a heating element for heating a resin.

7. The adhesive splitter system according to claim 1, wherein the fluid conveyor is press-fitted into the fluid inlet of the multi-nozzle adapter.

8. The adhesive splitter system according to claim 1, wherein the fluid conveyor is twist-locked into the fluid inlet of the multi-nozzle adapter.

9. The adhesive splitter system according to claim 1, wherein the fluid conveyor is formed from polypropylene.

10. The adhesive splitter system according to claim 1, wherein the multi-nozzle adapter is made of polymer.

11. The adhesive splitter system of claim 10, wherein the polymer is polyethylene terephthalate (PET).

12. The adhesive splitter system according to claim 1, wherein the multi-nozzle adapter comprises from 2 to 24 nozzles.

13. The adhesive splitter system according to claim 1, wherein the multi-nozzle adapter is made of one single piece.

14. The adhesive splitter system according to claim 1, wherein the multi-nozzle adapter is 3D printed.

15. A method for evenly applying adhesive to a substrate, the method comprising:

loading a resin and a hardener into separate chambers of an adhesive dispenser;

facilitating a flow of the resin and a separate flow of the hardener from the adhesive dispenser into a fluid conveyor, the fluid conveyor comprising a hollow tube having an inner surface, wherein fins are disposed on the inner surface of the hollow tube to create a turbulent flow for mixing the resin and the hardener;

mixing the resin and the hardener inside the fluid conveyor to create an adhesive;

providing a multi-nozzle adapter connected to the fluid conveyor, the multi-nozzle adapter comprising:

a fluid inlet, a plurality of fluid outlets, and a fluid dispersion assembly in fluid communication with the fluid inlet and the plurality of fluid outlets, wherein the fluid dispersion assembly includes a set of channels, each channel including a single channel inlet and a plurality of channel outlets, and a set of nozzle clusters, wherein each cluster is in fluid communication with one of the channel outlets; and feeding the adhesive into the multi-nozzle adapter through the fluid inlet, such that at a first stage of dispersion at least one channel receives a portion of the fed adhesive through its channel inlet and discharges some of that portion of adhesive through a channel outlet, and at a second stage of dispersion at least one nozzle cluster receives some portion of the adhesive from the channel outlet it is in fluid communication with and discharges some of that portion of adhesive through at least one of the fluid outlets.

16. The method of claim 15, wherein the applying adhesive to the substrate takes about 1 to 3 seconds.

17. The method of claim 15, wherein the multi-nozzle adapter is removable and replaceable.

18. The method according to claim 15, wherein the multi-nozzle adapter comprises a polymer.

* * * * *